United States Patent [19]

Lee et al.

[11] Patent Number: 5,138,880
[45] Date of Patent: Aug. 18, 1992

[54] DIGITAL LEVEL SENSING PROBE SYSTEM

[75] Inventors: Calvin S. Lee, Rancho Santa Margarita; Eliahou Tousson, Van Nuys, both of Calif.

[73] Assignee: Lee/Maatuk Engineering, Inc., Santa Ana, Calif.

[21] Appl. No.: 706,991

[22] Filed: May 29, 1991

[51] Int. Cl.$^5$ .............................................. G01F 23/26
[52] U.S. Cl. .................................... 73/304 C; 324/665
[58] Field of Search ........................ 73/304 C; 324/665

[56] References Cited

U.S. PATENT DOCUMENTS

| 3,343,415 | 9/1967 | Johnston | 73/304 C |
|---|---|---|---|
| 3,534,606 | 10/1970 | Stamler et al. | 73/304 C |
| 4,173,893 | 11/1979 | Hedrick | 73/304 C |
| 4,235,106 | 11/1980 | Maltby et al. | 73/304 C |
| 4,258,422 | 3/1981 | Dougherty et al. | 73/304 C |
| 4,350,039 | 9/1982 | Van Dyke et al. | 73/304 C |
| 4,417,473 | 11/1983 | Tward et al. | 73/304 C |
| 4,545,020 | 10/1985 | Brasfield | 73/304 C |
| 4,676,101 | 6/1987 | Baughman | 73/304 C |
| 4,780,705 | 10/1988 | Beane | 73/304 C |
| 4,841,227 | 6/1989 | Maier | 73/304 C |

FOREIGN PATENT DOCUMENTS

0748138  7/1980  U.S.S.R. .............................. 73/304 C

Primary Examiner—Allan N. Shoap
Assistant Examiner—Diego F. F. Gutierrez
Attorney, Agent, or Firm—Lloyd M. Forster

[57] ABSTRACT

Digital level sensing probe system including digital probe constructed of two (2) concentric cylinders, forming a set of discrete, cylindrical capacitors that use the substance whose level is to be measured as a dielectric material. The set of capacitors is arranged along the axis of measurement where each capacitor represents a discrete level increment. Each capacitor is assigned a unique time slot in a switching sequence. The first level capacitor is used as a reference to which all other capacitors are sequentially compared. In the switching sequence, an AC signal is applied across each capacitor and compared with the inverted signal which is applied across the first level capacitor. A logic "1" results when the substance is present and a logic "0" when the substance is absent. The logic is decoded and converted to display the appropriate quantity of substance measured.

20 Claims, 6 Drawing Sheets

$$C = \frac{2\pi \ell}{\ln(R_1/R_2)} \varepsilon$$

$$C_F = \frac{2\pi \ell}{\ln(R_1/R_2)} \varepsilon_{\text{SUBSTANCE}}$$

$$C_E = \frac{2\pi \ell}{\ln(R_1/R_2)} \varepsilon_{\text{AIR}}$$

DIGITAL LEVEL SENSING PROBE SYSTEM

BACKGROUND OF THE INVENTION

The present invention relates to a digital fluid level sensing probe system. A specific application involves liquid level sensing in a hostile environment such as the level of hot oil subjected to engine vibration in an automotive or other vehicle. State of the art in the case of automotive vehicles is limited to provision of a low level signal visible on the dashboard with no intermediate level information available other than by raising the hood and reading the level on a dip stick. This typically involves removing the dip stick, wiping it off, reinserting it, removing it for reading and reinserting it. The hostile environment precludes conventional liquid level sensing systems such as employed for fuel gages and has called for a unique solution to measuring fluid levels, preferably to meet the following conditions:

(1) High temperature, high shock/vibration, volatile fluid, presence of contaminents.
(2) Low cost, mass producible, robust, repeatability and product uniformity.
(3) Universally applicable in any shape container, although specifically designed to accommodate the wide-short profile of the automobile oil pan.
(4) Small probe profile in terms of volume displacement, especially in probe diameter.
(5) High resolution of volume measured per reading.
(6) Completely digital probe and electronics with data output directly in Binary-Coded-Decimal format.
(7) Low power consumption.

The closest prior art, of which applicants are aware, to the system disclosed herein comprise three U.S. patents found in a preliminary search of the art.

Ells U.S. Pat. No. 3,935,739 discloses a capacitive probe with one common electrode and individual opposite electrodes. An AC signal is impressed on the probe and simultaneously to all capacitive elements. The presence of dielectric material yields an analog current at the individual capacitor which is greater than the current yield in the absence of dielectric material. The AC current(s) are rectified and either summed to drive an analog meter, or shaped and synchronized to drive a digital display. Inherent limitations result from the following characteristics: the system measures absolute signal strength and is therefore subject to variations from temperature, contaminants, and dielectric constants; nonuniformity of capacitance values among the individual segments may cause inaccuracies; relatively large size requirements limit applications involving small containers.

Johnston U.S. Pat. No. 3,343,415 discloses a cylindrical capacitor comprising a common electrode (inner) with individual electrodes (outer) spaced along a vertical (longitudinal) axis. The detection methodology compares the signal output from any two adjacent capacitors. If both capacitors are immersed or if both capacitors are above the liquid level, the output signals are the same. If one capacitor is immersed and the other is above the liquid level, the outputs differ by the effect of the dielectric constant of the liquid. Each capacitor is assigned a unique level and therefore the level of the fluid can be determined by the detection of a difference signal. As in the Ells reference, nonuniformity of capacitance values among the individual segements may cause inaccuracies and relatively large size requirements limit applications as to container size. The system uses a differential comparator method but the electronic implementation may involve inaccuracies due to isolating devices in series with the data signal.

Johnston U.S. Pat. No. 3,552,209 discloses a specific application of the capacitive probe employed in the Johnston U.S. Pat. No. 3,343,415, which deals with a condition for measuring dynamic levels such as ocean swells and tidal effects. It involves the use of sampling techniques whereby liquid levels are instantaneously converted to pulse trains where the number of pulses in the train is a function of the liquid level and the time interval over which the sample is taken. The pulse count is averaged over a period of time and the mean level is determined. This system eliminates anomolies (infrequent disturbances) by averaging their effects.

GENERAL DESCRIPTION OF THE PRESENT INVENTION

The digital probe is constructed of two concentric cylinders, forming a set of discrete, cylindrical capacitors that use the substance whose level is to be measured as a dielectric material. The set of capacitors is arranged along the axis of measurement where each capacitor represents a discrete level increment.

Each capacitor is assigned a unique time slot in a switching sequence. The first level capacitor is used as a reference to which all other capacitors are sequentially compared. In the switching sequence, an AC signal is applied across each capacitor and compared with the inverted signal which is applied across the first level capacitor. A logic "1" results when the substance is present and a logic "0" when the substance is absent. The level data is decoded and converted to display the appropriate quantity of substance measured.

As compared to known prior art, the digital level sensing system of the present disclosure includes a number of distinguishing features:

Flexible printed circuit capacitors and circuit connections are etched onto a flexible printed circuit medium. The printed circuits are attached to rigid concentric cylinders. Each capacitor is formed by aligning the etched circuits or bands in concentricity along the longitudinal axis of the probe. The rigid cylinders are positively detented to accurately align the printed circuits and therefore the capacitor electrodes. The advantages of this implementation include mass producibility with no assembly of capacitors or wires or interconnects. It is possible to hold very tight tolerances with high accuracy, productivity and repeatability of capacitors. The probe is impervious to shock/vibration.

Individual isolated capacitor elements have no common electrodes or interconnections. The electronic methodology can ground all capacitors in the set except the reference and the single capacitor element being monitored. This implementation eliminates inaccuracies of capacitance values due to effects from adjacent capacitors and/or from a common electrode.

Time sequenced methodology is employed wherein each capacitor element in the set is assigned a unique time slot during which it is monitored. During the time slot, the selected capacitor element is compared to a reference capacitor element. All other capacitor elements may be grounded during the monitoring. The capacitor elements are sequentially monitored in a wraparound mode and the output from each monitored sequence is presented sequentially. The serial output of the sensed information minimizes the interconnection to the display unit. No more than three wires are required and theoretically one wire with chassis as a return may be employed. Accuracy is greatly enhanced by isolating the monitored capacitor from extraneous circuit events. The output is a direct reading in Binary-Coded-Decimal format.

An integrated EPROM or other nonvolatile storage device is employed for the container profile. A software algorithm for each container shape is written to a nonvolatile storage device. The memory contains volumetric data, such as, incremental volume per incremental capacitor element, which is unique to that container shape or form factor. The nonvolatile storage device can also contain other pertinent information, such as ID. Accordingly, the probe and electronics can be made universally applicable, independent of the container, and a single system can be manufactured greatly enhancing inventory control and economies of scale.

The system provides small capacitance sensing ability using linear operational amplifiers as current-to-voltage converters. The operational amplifiers amplify the output data at the same time, thereby eliminating the voltage drop of resistors used in other systems which attenuate the data and create inaccuracies. The system also eliminates the need for isolation diodes and other switching devices which attenuate the data and create inaccuracies.

The foregoing distinguishing features combine to make achievable a digital sensing system which can have the smallest probe possible and still be applicable in any larger configuration. It is possible to construct capacitances of less than one picofarad uniformly throughout the capacitor set and to detect the very small currents resulting, all in a digital mode, which allow the manufacture of small diameter probes with the highest probe resolution (highest number of individual segments per unit height).

Accordingly, the present invention uniquely solves the problem of measuring volume increments of a viscous fluid within a space having a large surface area to depth ratio. An automobile oil pan is one such application. The oil pan is shallow (less than 6 inches in usable depth) with a relatively larger surface area (greater than 120 square inches) containing a viscous fluid. Additionally, there are other challenges from particulate, high temperatures, shock, vibration and the presence of volatile gases. The absolute volume of the automobile oil pan also presents a special condition by requiring that the measuring system be small enough not to contaminate the measurement by displacement. In summary, the disclosed system provides a means to measure small volumetric changes in fluid levels digitally in containers having the impractical form factor of a large surface area to depth ratio and from which the container volume is small and the fluid is viscous and for which the enviroment is hostile.

DETAILED DESCRIPTION OF A PREFERRED EMBODIMENT

Figure 1:
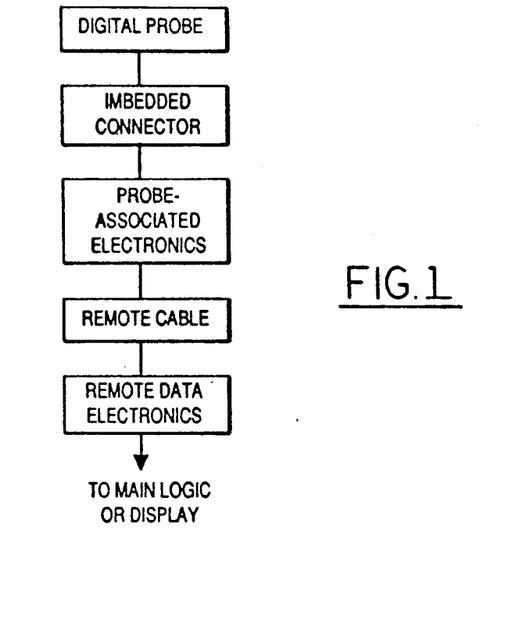
FIG. 1 is a schematic diagram identifying the major components of the subject digital level sensing probe system.

With reference to FIG. 1, the main components of the system include DIGITAL PROBE, IMBEDDED CONNECTOR, PROBE ASSOCIATED ELECTRONICS, REMOTE CABLE, AND REMOTE DATA ELECTRONICS leading TO MAIN LOGIC OR DISPLAY, as illustrated in the block diagram.

Figure 2:
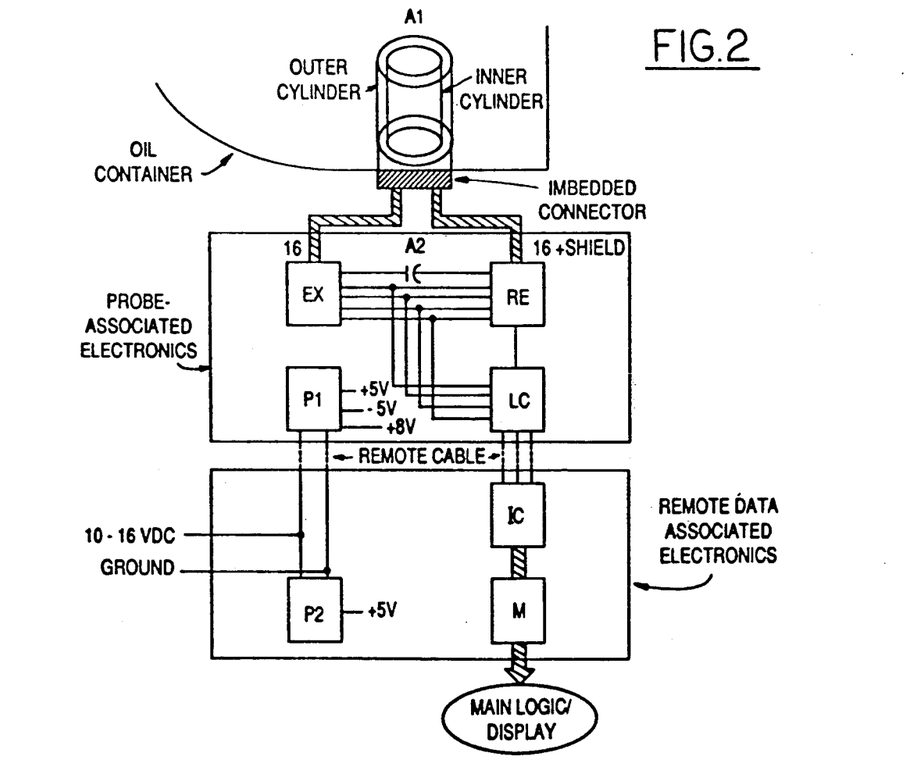
FIG. 2 is a more detailed, schematic diagram identifying respective additional elements employed.
Figure 3:
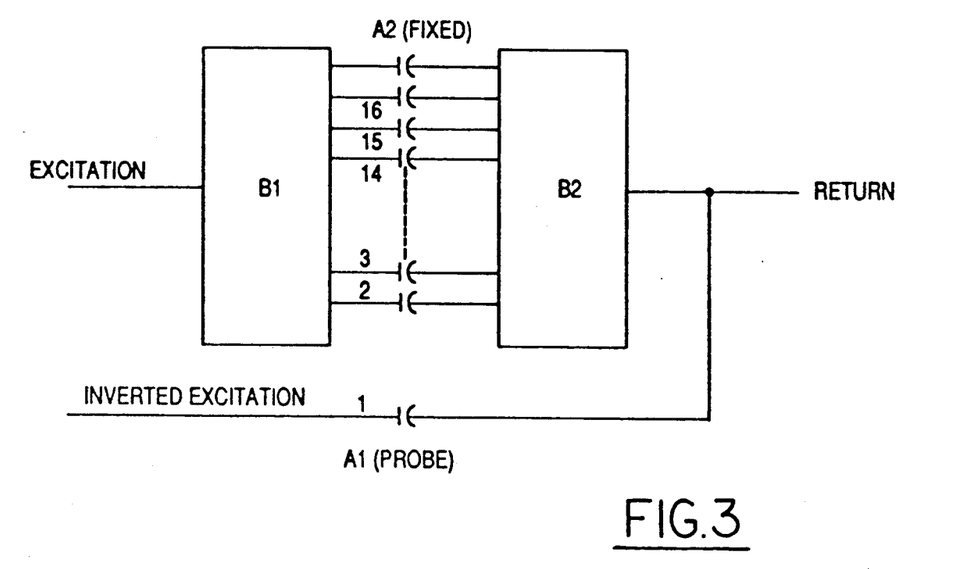
FIGS. 3, 3A and 3B are schematic diagrams of a probe employed in the disclosed embodiment with related capacitor formulae.
Figure 4:
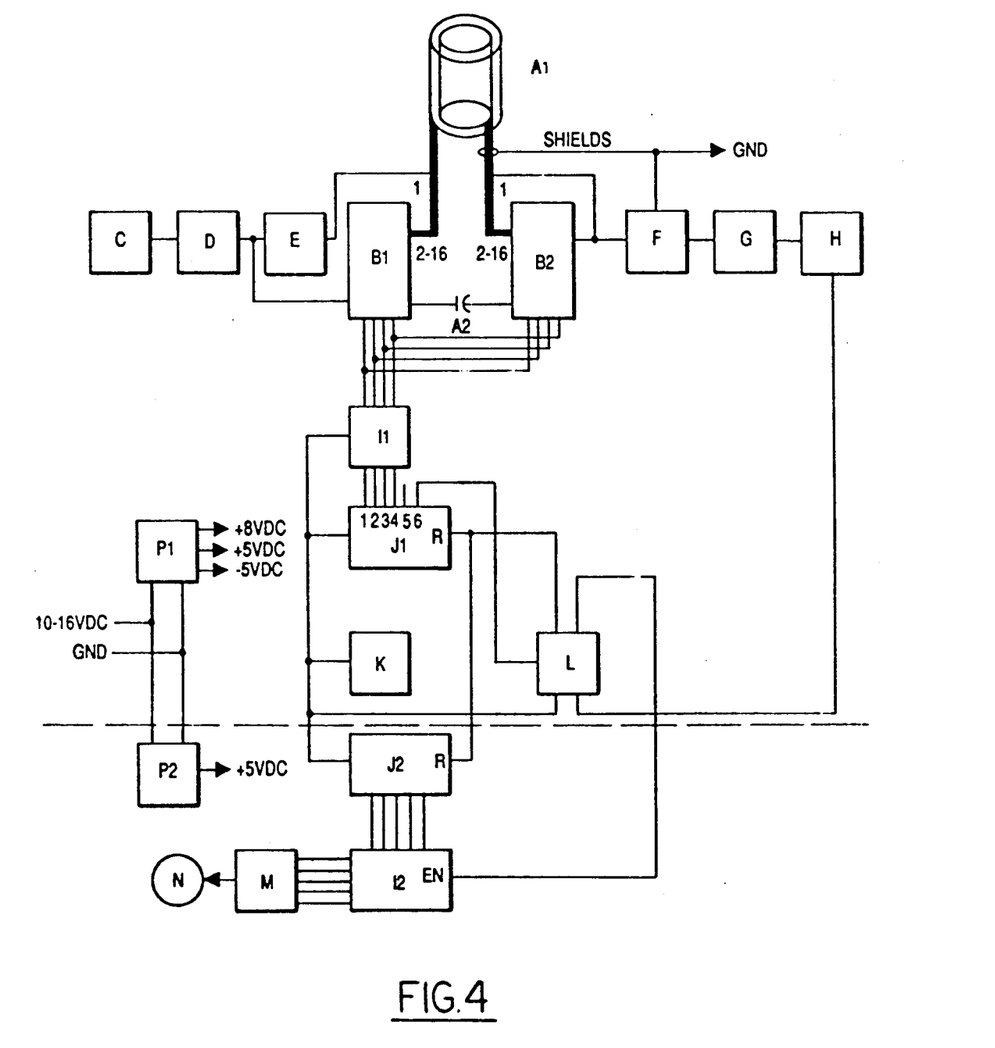
FIG. 4 is a further, still more detailed schematic drawing of the digital level sensing system.
Figures 5A, 5B, 5C, 5D:
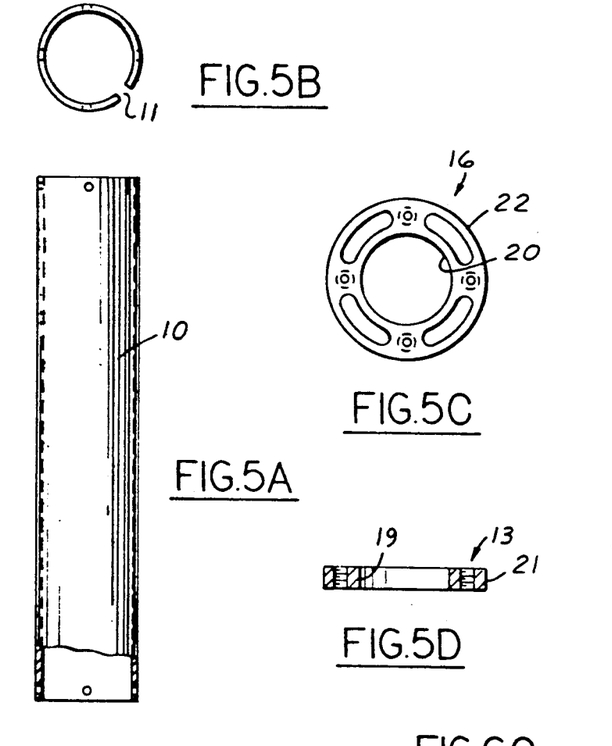
FIGS. 5A-5F are constructional views of the probe tubular housing and end cap components thereof.
Figure 5E:
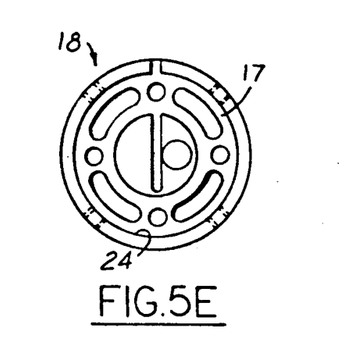
Figure 5F:
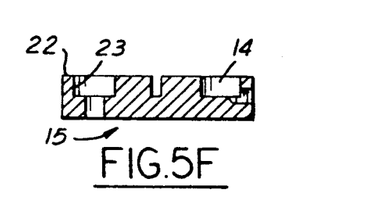

With reference to FIGS. 2, 3 and 4, the main components of FIG. 1 are more particularly identified by the schematic illustration of the DIGITAL PROBE A1 INNER CYLINDER and OUTER CYLINDER shown in an OIL CONTAINER disposed over an IMBEDDED CONNECTOR; PROBE ASSOCIATED ELECTRONICS including EXCITATION "EX" with schematic blocks B1, C, D and E, representing respectively a LOW Z SWITCHING NETWORK, a SINUSOIDAL OSCILLATOR, an AMPLIFIER and an INVERTER; POWER SUPPLY "P1" having +5 VDC, −5 VDC and +8 VDC; RETURN "RE" with schematic blocks B2, F, G and H, representing respectively, a HIGH Z SWITCHING NETWORK, a CURRENT/VOLTAGE CONVERTER/AMPLIFIER, an AMPLIFIER and a SCHMITT TRIGGER AND FILTER; and LOGIC CONTROL "LC" with schematic blocks I1, J1, K and L, representing respectively SWITCHES CONTROL LATCH, a BINARY COUNTER, a SYSTEM CLOCK and a LOGIC CONTROL CIRCUIT.

REMOTE CABLE connections are provided from PROBE ASSOCIATED ELECTRONICS to REMOTE DATA ASSOCIATED ELECTRONICS which include: POWER SUPPLY "P2" WITH +5 VDC; REMOTE LOGIC "IC", with schematic blocks J2 and I2, representing respectively a DECADE COUNTER, and REMOTE INTERFACE LATCH; and a block "M" representing a LEVEL-TO-VOLUME CONVERSION leading to an AUTO MAIN LOGIC OR DISPLAY "N".

With further reference to FIG. 3, a fixed capacitor A2, is provided between the EXCITATION, B1 LOW Z SWITCHING NETWORK and RETURN, B2, HIGH Z SWITCHING NETWORK; an INVERTED EXCITATION capacitor is connected to RETURN;

and individual capacitors 2-16 are provided between respective NETWORKS B1 and B2.

Figure 3A:
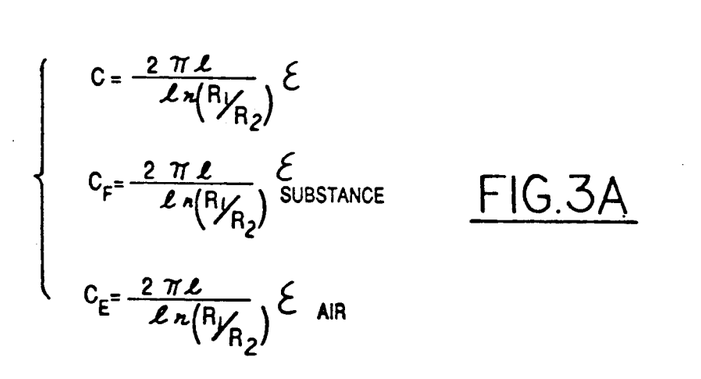
Figure 3B:
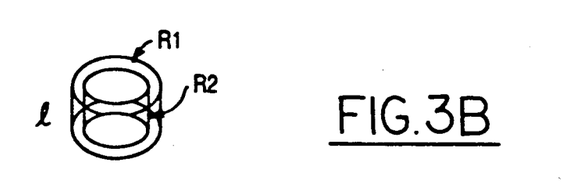

The capacitance of each subsensor element is determined by its height L, outer radius R1, inner radius R2, and dielectric constant, in accordance with the general formula shown, with capacitance $C_F$ equal to that of a subsensor full of the measured substance and capacitance $C_E$, that of a subsensor absent the measured substance.

Figure 6A:
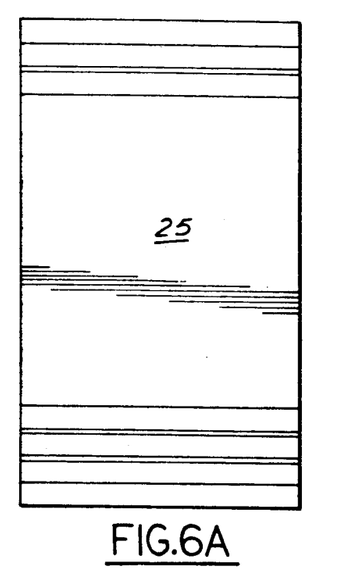
FIGS. 6A and 6B are layout views of flexible printed circuits shown as etched in the flat.
Figure 6B:
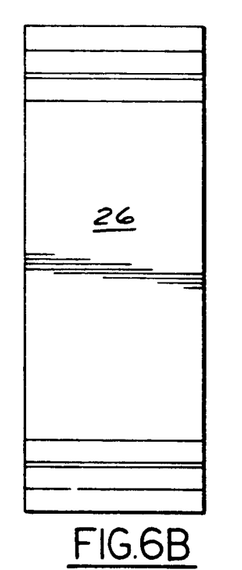
Figure 6C:
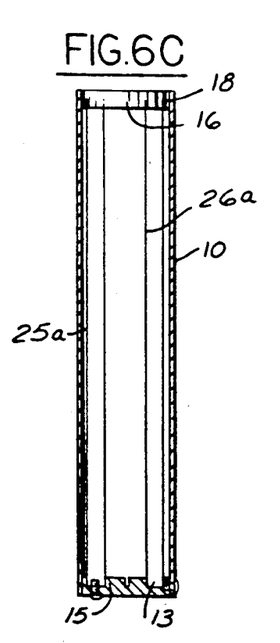
FIG. 6C is a sectional side elevation illustrating respective inner and outer flexible printed circuits as installed in the tubular housing of the probe assembly.

With reference to FIGS. 5A-5F, aluminum probe housing 10 is formed with gap 11 and is adapted for insertion of flexible printed circuits with etched electrodes formed into tubes which are retained by respective end caps, FIGS. 5C-5F, nested within aluminum housing 10. Such end caps are shown enlarged, relative to outer housing 10, and are assembled to retain the flexible printed circuits as follows: Lower end cap 13 nests within annular recess 14 in lower end cap 15 which in turn fits within the lower end of housing 10. Upper end cap 16 nests within recess 17 in upper end cap 18 which in turn fits within the upper end of housing 10. An inner flexible cylindrical printed circuit, not shown in FIGS. 5A-5F, is retained within inner walls 19 and 20 of respective end caps 13 and 16 and an outer cylindrical flexible printed circuit is retained between the outer perimeters 21 and 22 of end caps 13 and 16 and inner perimeters 23 and 24 of end caps 15 and 18. The assembled relation of probe components is illustrated in FIG. 6C wherein outer printed circuit 25, shown as etched in the flat in FIG. 6A, is formed into a tube 25a as shown in FIG. 6C. Likewise, inner printed circuit 26 of FIG. 6B is formed into tube 26a in the assembled probe.

Figure 7A:
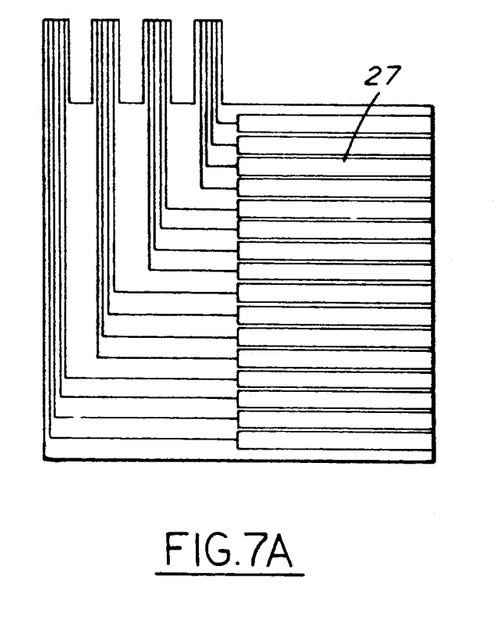
FIGS. 7A and 7B are layout views of flexible printed circuits for a a modified probe.
Figure 7B:
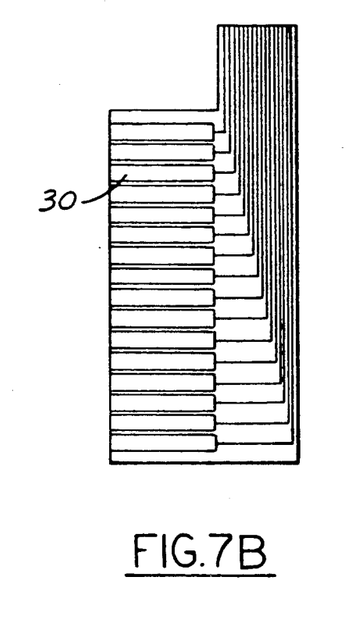
Figure 7C:
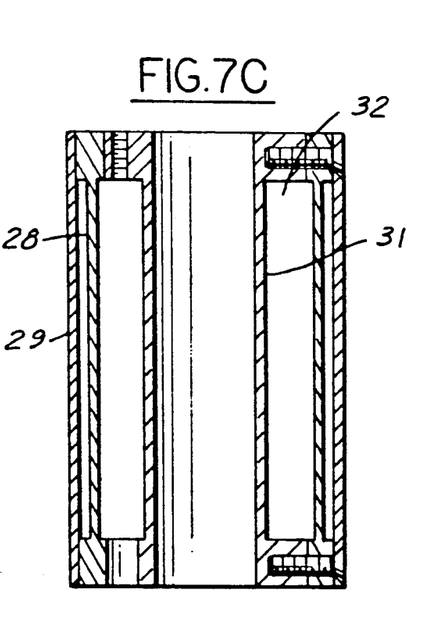
FIG. 7C is a sectional side elevation of the modified probe assembly.
Figure 8:
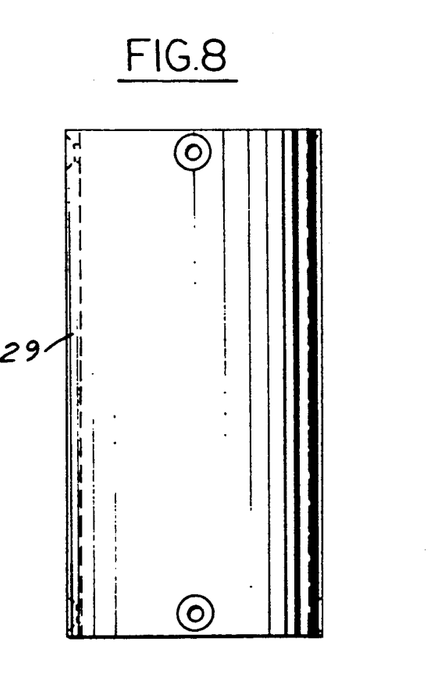
FIG. 8 is an enlarged side elevation of the encasing tube per se of the FIGS. 7A-7C modification.
Figure 9:
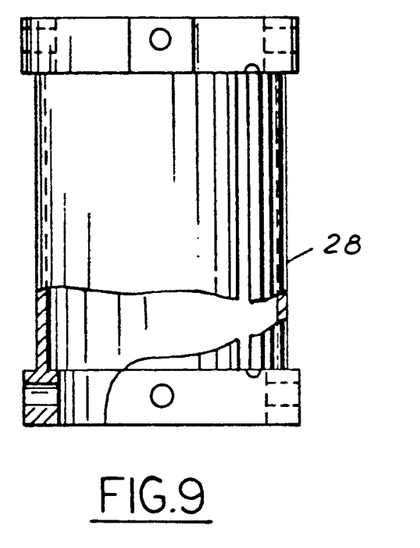
FIG. 9 is a partially sectioned side elevation of the outer mandrel per se of the FIGS. 7A-7C modification.
Figure 10:
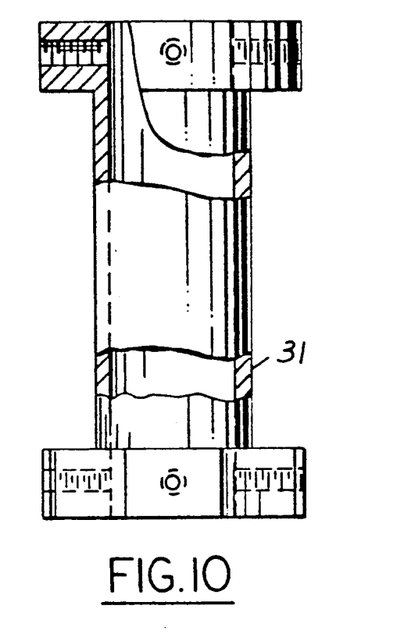
FIG. 10 is a partially sectioned side elevation of the inner mandrel per se of the FIGS. 7A-7C modification.

With reference to FIGS. 7A-7C, 8, 9 and 10, a modified probe employs a pair of rigid spools onto the cylindrical surfaces of which inner and outer flexible circuits are adhered in facing relation. Accordingly, outer printed circuit 27, shown in the flat in FIG. 7A, is adhered to the inner surface of outer mandrel (spool) 28 nested within encasing tube 29 and inner flexible printed circuit 30, shown in the flat in FIG. 7B, is adhered to the outer surface of inner mandrel (spool) 31. The respective spool ends are sized to nest respectively within encasing tube 29 while providing appropriate space 32 between the facing printed circuits for dielectric material to be detected.

Figure 11:
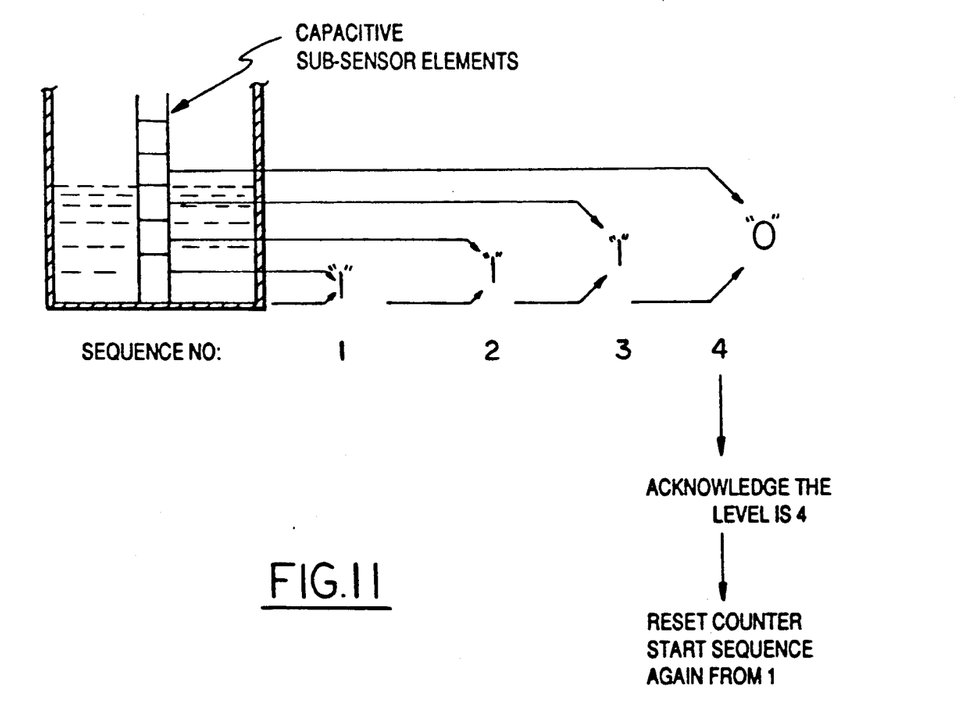
FIG. 11 is a schematic view illustrating the sequence of digital level sensing employed in the disclosed embodiment.

With reference to FIG. 11, in summary, the herein disclosed digital level sensing probe system has the following characteristics:

The digital sensor is a sensor which senses only discrete values of the sensed property by means of a yes ("1") or no ("0") output for each monitored division. This is in contrast to analog sensors which give a continuous output of the sensed property value.

The digital sensor is an array of subsensors, each of which reads "1" or "0", or ON/OFF, or binary format, only. The number of subsensors in the array, or the separation between two adjacent divisions to be read by the sensor, determines the resolution of the measurement. The discrete subsensors are controlled by a logic circuit which rationalizes the measured value.

The capacitive type digital level-sensing probe is constructed of an array of discrete, cylindrical, equal capacitors that use the substance whose level is to be measured as the dielectric material. The array of capacitors is arranged along the axis of measurement, where each capacitor represents a discrete level increment.

The control logic circuit controls the probe capacitors (the set of subsensors) by a switching network. Each capacitor is assigned a unique time slot in a switching sequence. The electronics allows for the grounding of all other capacitor elements during this time. The first (bottom) level capacitor is used as a reference to which all other capacitors are sequentially compared. This method has the advantage of compensating for variation in the dielectric constant of the measured substance and for changes in the probe itself.

In the switching sequence, a signal $V = V_o * SIN(wt)$ is applied across each capacitor starting from the second element (subsensor) above the reference element. Each application of signal V applied to one subsensor results in a current output signal $I = C*dV/dt = C*V_o*w*COS(wt)$. This current summed with the current outputting from the reference element which, in turn, has been excited by an inverted signal $V_i = V_o*SIN(wt + \pi)$. Hence, when the substance is present in the sequenced capacitor, the result is a null, or zero current (assuming the reference element is immersed in substance) which translates to a logic "1". When the substance is absent in the sequenced segment, but present in the reference segment, the resulting summed current is non-zero, translating into a logic "0".

When the first logic "0" is obtained, the control circuit electronically tags the substance level and instructs the counter controlling the switching sequence to reset and start the sequence over. The completely full (of substance) condition is determined by obtaining the logic "0" when the first (reference) element is compared to a fixed element (A2 in the schematics), the value of which is different enough from the "full" capacitance value, $C_F$. In the completely empty condition (reference element is empty), level zero is determined by choosing the fixed capacitor value to be close to the "empty" capacitance value, $C_E$; then the level zero is recognized through the counter and not by a logic "0" from the probe. The acknowledged level in the logic circuit (a binary number) is decoded and converted to display the appropriate quantity of substance measured.

As shown in FIG. 11, a reading of level 4 means that the substance level is between 3.5 and 4.5 increment levels from the bottom increment.

As can be seen from the above description, the capacitor subsensor elements are critical to the operation of the digital probe. In order to satisfy the accuracy, resolution, and probe size criteria, the capacitor elements meet three conflicting, and heretofore mutually exclusive requirements: Very small physical size of the electrodes in order to get a sufficient number of vertical elements to achieve resolution and a small probe diameter; leave enough space between electrodes to allow unrestricted draining of viscous liquid; maintain dimensional tolerances of the capacitor electrode areas and gap distance to achieve accurate capacitance values; insure that all capacitors are uniform in terms of capacitance values.

The printed circuit discrete capacitors, having independence from common electrodes or interconnects, afford the ability to make very small, very close toleranced capacitor electrodes on a mass production scale. The time sequencing and isolation of capacitors as well as the current summing methodology allow work with the very small capacitances resulting.

While in the preferred embodiment the capacitors are constructed by printed circuit etch on flexible material, it would be possible to make such capacitors as an integral part of rigid cylinders or could themselves be the cylinders, while retaining the functional performance of the preferred embodiment. Also, while the disclosed construction employing concentric cylinders is preferred for high accuracy requirements, other printed circuit configurations are possible, e.g., the circuits shown as printed in the flat in FIGS. 6A and 6B, or in FIGS. 7A and 7B, could be mounted in facing relation on flat support elements with appropriate aligned spacing.

We claim:

1. Digital fluid level sensing probe system comprising digital probe fluid level sensing means constructed of a set of capacitors arranged along an axis of measurement where each capacitor represents a discrete level increment in dielectric material fluid to be measured, switching sequence means wherein each capacitor is assigned a unique time slot for sequential comparison reference to a first level capacitor, means for applying an AC signal in switching sequence across each capacitor above the first level capacitor, means for applying an inverted AC signal across the first level capacitor for comparison with each of said AC signals applied in switching sequence, including means for discriminating between respective signals to provide a logic "1" when fluid is present and a logic "0" when fluid is absent, or vice versa, and means for decoding and converting said logic to display the appropriate quantity of fluid measured in increments corresponding to said discrete capacitors.

2. System of claim 1 wherein each capacitor includes flexible printed circuits with capacitor electrodes and circuit connections etched onto a flexible printed circuit medium.

3. System of claim 2 wherein said flexible printed circuit capacitors are attached to rigid concentric cylinders.

4. System of claim 2 wherein each capacitor is formed by aligning the etched circuits in concentricity along the longitudinal axis of the probe.

5. System of claim 3 wherein said rigid cylinders are positively detented to accurately align the printed circuits and therefore the capacitor electrodes.

6. System of claim 1 wherein said capacitors are constructed as an integral part of rigid cylinders.

7. System of claim 1 wherein said capacitors have no common electrodes or interconnections.

8. System of claim 1 wherein all capacitors in the set are grounded except the first level capacitor and the single capacitor being monitored.

9. System of claim 1 including reset means whereby each capacitor in the set is repeatedly recompared while being monitored in its assigned unique time slot.

10. System of claim 9 including reset means wherein the time slots when each capacitor is compared to the first level capacitor are reset each time a signal that fluid is absent occurs.

11. System of claim 10 including means for grounding all other capacitors during the monitoring.

12. System of claim 1 including means wherein the capacitors are sequentially monitored in a wraparound mode.

13. System of claim 12 including means for applying a signal V across each capacitor in sequence wherein the output from each monitored sequence is presented sequentially.

14. System of claim 13 including means for reading the output directly in Binary-Coded-Decimal format.

15. System of claim 1 including an integrated EPROM or equivalent nonvolatile storage device for container profile.

16. System of claim 15 including a software algorithm for each container shape written into the nonvolatile storage device.

17. System of claim 16 wherein said nonvolatile storage device includes memory for volumetric data.

18. System of claim 1 including linear operational amplifiers as current-to-voltage converters.

19. System of claim 18 wherein said operational amplifiers include means for amplifying the output data at the same time.

20. System of claim 1 including means for providing said set of capacitors in a uniform set of individual capacitors having capacitances of less than one picofarad each.

* * * * *